United States Patent [19]
Long et al.

[11] Patent Number: 5,593,640
[45] Date of Patent: Jan. 14, 1997

[54] PORTABLE HYDROGEN GENERATOR

[75] Inventors: Eugene Long, Boulder; Jeff Schmidt, Superior; Frank Lynch, Conifer, all of Colo.

[73] Assignee: Ball Corporation, Muncie, Ind.

[21] Appl. No.: 476,729

[22] Filed: Jun. 7, 1995

[51] Int. Cl.$^6$ ........................................ B01J 7/02
[52] U.S. Cl. .................... 422/111; 422/129; 423/657; 48/61
[58] Field of Search .................... 422/129, 111, 422/239; 423/657; 48/61, 4, 197 R

[56] References Cited

U.S. PATENT DOCUMENTS

| | | |
|---|---|---|
| 2,334,211 | 11/1943 | Miller . |
| 3,174,833 | 3/1965 | Blackmer . |
| 3,346,506 | 10/1967 | Beumel . |
| 3,734,863 | 5/1973 | Beckert et al. . |
| 3,862,052 | 1/1975 | Beckert et al. . |
| 3,977,990 | 8/1976 | Beckert et al. ............... 423/648 |
| 4,155,712 | 5/1979 | Taschek ........................ 422/239 |
| 4,261,955 | 4/1981 | Bailey, Jr. et al. ............ 422/239 |
| 4,341,651 | 7/1982 | Beckert et al. ............... 423/648 |
| 4,604,151 | 8/1986 | Knowlton et al. ............ 422/164 |
| 4,673,528 | 6/1987 | Artz et al. .................... 423/648 |
| 4,737,161 | 4/1988 | Szydlowski et al. ............ 48/61 |
| 4,755,190 | 7/1988 | Harris ............................ 48/61 |

OTHER PUBLICATIONS

"Design for the cold start–up of a man-portable fuel cell and hydrogen storage system," J. of Power Sources, 41, 1993, pp. 335–357, Ward et al.
"A Study of the Thermal Decomposition of Complex Metal Hydrides," Inorg. Chem. vol. 11, No. 6, 1972, pp. 1230–1236.
Ullmann's Encyclopedia of Indus. Chem., "Hydrides," pp. 199–226, VCH, 1989.
"IV. Hydride–Symposium," 7th & 8th May, 1987, Goslar–Langelsheim, Chemetall, GmbH.
Inorganic Chemistry, V. 11, No. 6, 1972 *A Study of the Thermal Decompositon of Complex Metal Hydrides*, by Dilts, et al.
Journal of Power Sources, 41 (1993) 335–352 *Design for the cold start–up of a man-portable fuel cell and hydrogen storage system*, by Ward, et al.
Ullmann's Encyclopedia of Industrial Chemistry, 5th Ed., 1989, *Hydrides*, by Rittmeyer, et al.
Chemetall GmBH, IV. *Hydride–Symposium 7th and 8th May 1987*, Goslar, Langelsheim.

*Primary Examiner*—Timothy McMahon
*Attorney, Agent, or Firm*—Gilbert E. Alberding

[57] ABSTRACT

A hydrogen generator employs substantially adiabatic hydrolysis and thermal decomposition of chemical hydrides to provide a controllable generation of hydrogen from a small, lightweight container. The hydrogen generator includes a thermally isolated container for containing a chemical hydride, a preheater to heat the chemical hydride to a predetermined temperature before the chemical hydride is hydrolyzed, a water supply controlled to maintain substantially adiabatic and controlled generation of hydrogen from said chemical hydride, and a buffer to supply an initial flow of hydrogen during generator start-up, absorb excess hydrogen during generator shut-down, and to smooth the hydrogen flow due to changing loads.

54 Claims, 4 Drawing Sheets

PORTABLE HYDROGEN GENERATOR

FIELD OF THE INVENTION

The present invention relates to a hydrogen generator, and more particularly to a lightweight, portable and nearly adiabatic hydrogen generator and to a method for generating hydrogen.

BACKGROUND OF THE INVENTION

Hydrogen generators have long been used to generate hydrogen through the hydrolysis of chemical hydrides, and in particular, metal hydrides. For example, U.S. Pat. No. 2,334,211 discloses a hand-held generator containing calcium hydrides which, when submersed in water, produces sufficient hydrogen to fill an emergency signal balloon. More recently, the most common portable source of hydrogen is hydrogen bottles or tanks in which the hydrogen is stored under pressure. The hydrogen stored in these bottles or tanks is generated at a hydrogen production plant, shipped as a cryogenic liquid, vaporized, and expanded into the tanks or bottles under pressure. These hydrogen tanks or bottles are generally bulky and rather heavy. Further, when a tank or bottle is exhausted, it must be replaced with another tank or bottle. Storage tanks or bottles are utilized in field applications because, typically, hydrogen production facilities have been considered too large, too heavy, too expensive and in many instances, too unsafe, for portable operation. In response, there have been attempts to develop practical and portable hydrogen generators.

One such portable hydrogen generator, for example, is disclosed in U.S. Pat. No. 4,155,712. U.S. Pat. No. 4,155,712 discloses a small portable hydrogen generator utilizing a metal hydride and water vapor in which hydrogen can be automatically produced on demand or at a constant pressure feed over widely varying hydrogen demand rates without water supply contamination or metal hydride caking complications. Among the problems in the use of demand responsive hydrogen generators, however, is that of a sudden requirement made on the water vapor such that water instead of the water vapor could be drawn into direct contact with the fuel, thus causing a malfunction. U.S. Pat. No. 4,261,955 addresses this problem by utilizing a wall means for separating adjacently disposed solid fuel and water compartments. The wall means includes two spaced apart porous hydrophobic membranes. During normal production of hydrogen gas, the membranes are of a character as to normally only pass water vapor from the water supply to the fuel compartment. If an abnormal demand is made on the water vapor, it could inadvertently cause unvaporized water to pass through one of the membranes. Therefore, a hydrogen gas outlet is positioned between the spaced-apart membranes to pull off the water before it could reach the metal hydride fuel.

Both U.S. Pat. Nos. 4,155,712 and 4,261,955 disclose using compounds with a chemical hydride, such as lithium aluminum hydride ($LiAlH_4$) in an attempt to control internally generated heat. Presently, however, no commercially viable small portable hydrogen generators are able to supply hydrogen instantaneously and sustain a constant flow of hydrogen while controlling external structural heating and uncontrollably escalating temperatures and pressures in the generator due to uncontrolled hydrogen release by the chemical hydride. As a result, industry typically still uses high pressure gas storage, metal hydride storage, or liquid hydrogen for a hydrogen gas supply.

Thus, an improved hydrogen generator is needed which is lightweight, compact, portable, and temperature safe and which provides a controllable flow of hydrogen upon demand.

SUMMARY OF THE INVENTION

The present invention employs an adiabatic hydrolysis and thermal decomposition of a chemical hydride to provide a controllable generation of hydrogen from a small, lightweight, portable and hand handleable container. A preferred hydrogen generator of the invention includes a thermally isolated container for containing a first chemical hydride; heating means for heating the first chemical hydride to a predetermined temperature; a water supply for hydrolysis of the first chemical hydride only after the first chemical hydride reaches the predetermined temperature; a buffer, or recovery device, for recovering hydrogen from the container; and a control unit for controlling the rate of generation of hydrogen by the hydrogen generator. The buffer is also used for hydrogen generation during startup and for smoothing hydrogen production rates to follow demand variations.

In preferred embodiments of the invention, the container comprises a dewar having an outer shell and an inner vessel defining an evacuated space therebetween, and having an insulating material positioned in the evacuated space, wherein the first chemical hydride is placed within the inner vessel. Preferably, the first chemical hydride is a metal hydride, and more preferably, a metal hydride having at least one metal taken from a group consisting of the metals found in the first three rows of the periodic chart. Such a metal hydride can be a ternary composition, such as for example, a ternary composition consisting essentially of $LiAlH_4$.

Preferably, the heating unit heats the first chemical hydride to a temperature greater than about 100 degrees C. Such a heating unit can include a chemical composition, including, for example, a second chemical hydride positioned in the container between the first chemical hydride and the water supply for generating an exothermic reaction when the chemical composition is combined with water. As an alternative, or as a supplement to the chemical composition heating unit, the heating unit may include an electrical heater.

The water supply includes a water source, a water pump hydraulically coupled to the water source and electrically coupled to the control means, and a water conduit coupled between the water pump and the container. The water supply further includes an annular filter positioned in the container adjacent to an outlet of the water conduit. Still further, the second chemical hydride is a mixture of a compressible porous medium and a chemical hydride positioned between the annular filter and the first chemical hydride. The mixture prevents caking and increase porosity of the second chemical hydride.

The hydrogen buffer includes an outlet conduit coupled to the container, a buffer chamber coupled to the outlet conduit, and a rechargeable hydride positioned in the buffer chamber. The rechargeable hydride supplies hydrogen to the outlet conduit whenever the hydrogen demand exceeds the rate of generation by the chemical hydrides. It also absorbs excess hydrogen after the water supply has been stopped from supplying water to the container by the control unit. Preferably, the rechargeable hydride is a metal hydride.

The hydrogen generator further includes a control unit for controlling an amount of hydrogen generated. The control unit includes a pressure switch coupled to the hydrogen conduit, wherein the pressure switch senses a pressure of the hydrogen to generate a signal corresponding to the pressure of the hydrogen. The pressure switch is coupled to the water source to control a flow of water to the container based on the pressure signal. Thus, the control unit controls the rate of hydrogen generation.

In preferred hydrogen generators, the chemical composition generates sufficient heat to raise the temperature of the preferred $LiAlH_4$ above about 100 degrees C. prior to the hydration of the $LiAlH_4$. The chemical composition includes a second metal hydride, such as $CaH_2$ or other similar hydride, and a compressible porous medium, such as vermiculite. Such a chemical composition, through hydrolysis, generates an exothermic reaction and exhibits stable hydrogen generation characteristics while at a temperature below about 590 degrees C.

Viewed in another way, the invention comprises a hydrogen generator, including a container; a water source having a water conduit for supplying water into the container; a first chemical hydride placed in the container; a chemical composition positioned in the container between the first chemical hydride and an outlet of the water conduit, the chemical composition being adapted to react with water supplied from the outlet of the water conduit to heat the first chemical hydride, and delay hydration of the first chemical hydride until it has reached a temperature sufficient to prevent the first chemical hydride from undergoing an unstable exothermic reaction; and a buffer for recovering hydrogen from the container.

A preferred method of the invention includes the steps of placing a first chemical hydride in a thermally isolated container; heating the first chemical hydride to a predetermined temperature; hydrolyzing the first chemical hydride only after the first chemical hydride reaches the predetermined temperature; recovering hydrogen from the container; and controlling an amount of hydrogen generated by the hydrogen generator. The entire process balances the exothermic chemical reaction with the endothermic decomposition in the first chemical hydride.

The invention, described briefly above in its various embodiments, provides a lightweight, portable, and substantially adiabatic hydrogen generator. However, other features and advantages of the invention may be determined from the drawings and detailed description of the invention that follows.

DETAILED DESCRIPTION OF THE PREFERRED EMBODIMENTS

Figure 1:
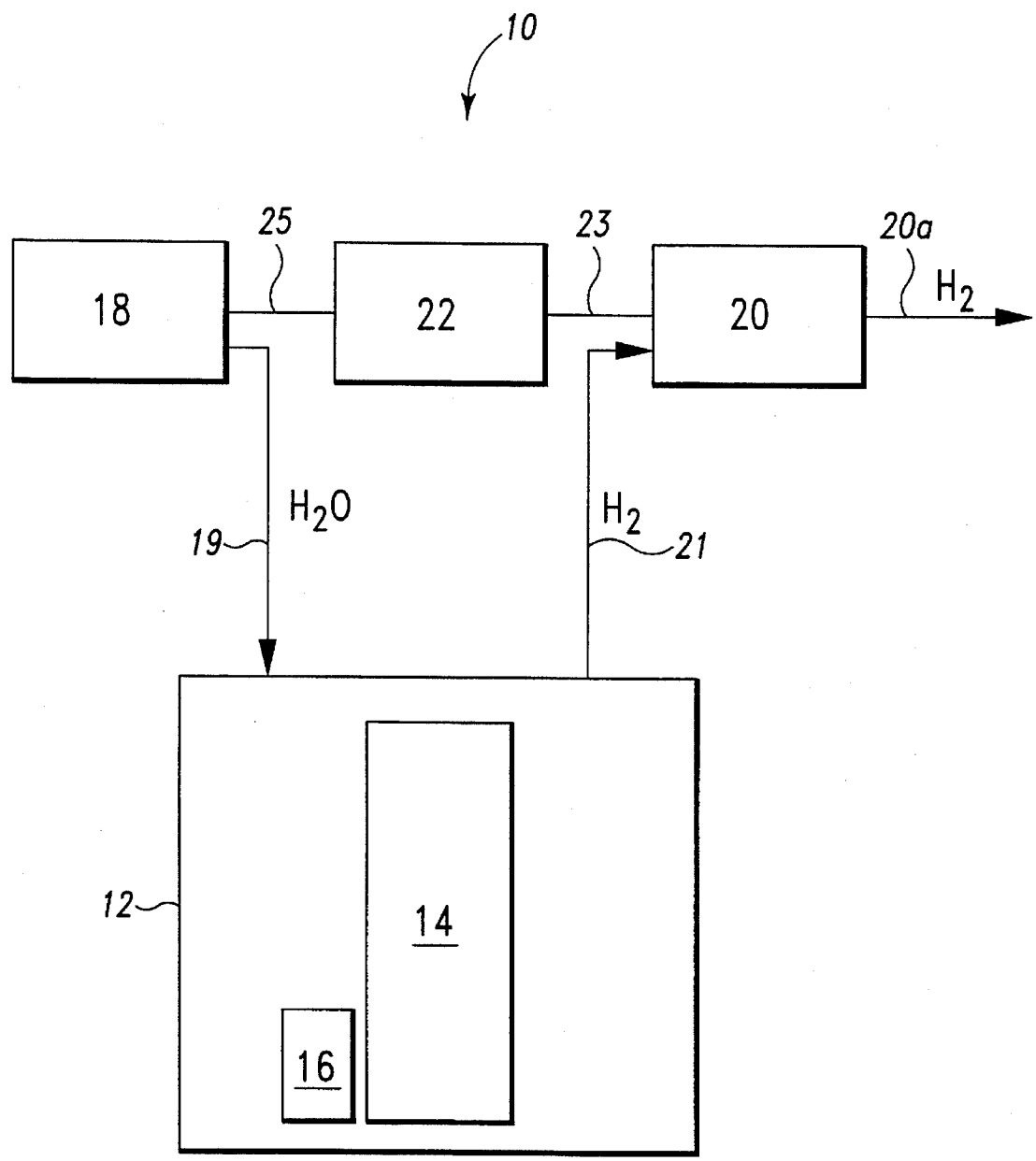
FIG. 1 shows a general block diagram of a hydrogen generator embodying the invention.

FIG. 1 shows a hydrogen generator 10 embodying the invention. Hydrogen generator 10 includes a thermally isolated container 12, such as a vacuum insulated, multiple wall dewar similar to a cryogenic dewar, containing a primary chemical hydride 14, preferably a metal hydride, such as, for example, lithium aluminum hydride ($LiAlH_4$). Primary chemical hydride 14 undergoes both hydrolysis and thermal decomposition reactions to generate hydrogen ($H_2$).

As used herein, hydrolysis is the exothermic chemical reaction of a chemical hydride, such as $LiAlH_4$, with water to form oxides or hydroxides and hydrogen. Endothermic decomposition occurs in the chemical hydride when the heat completes the reaction to form hydrogen and other byproducts.

A heating unit 16 is positioned adjacent chemical hydride 14 and, when activated, heats primary chemical hydride 14 to a pre-determined temperature (preferably about 100 degrees C. for $LiAlH_4$). Activation of heating unit 16 avoids chemical reactions associated with primary chemical hydride 14 which can result in large water release, and, thus, avoids an uncontrollable hydrogen release and an increase in pressure in container 26 during initial hydration of primary chemical hydride 14.

Water supply 18 supplies water into a water conduit 19, which in turn is coupled to container 12. After primary chemical hydride 14 reaches the predetermined temperature (about 100 degrees C. for $LiAlH_4$), the water from conduit 19 is converted to steam which permeates into primary chemical hydride 14, thereby hydrolyzing chemical hydride 14 to generate hydrogen. The rate of hydrogen generation from primary chemical hydride 14 is determined, in primary part, by the rate that water is supplied to container 12 by water supply 18.

In practicing the invention, it is important to avoid hydrating primary chemical hydride 14 prior to the temperature of chemical hydride 14 reaching the predetermined temperature. As more fully described below, this can be accomplished by either (1) preheating primary chemical hydride 14 with a heater, such as an electric heater, prior to delivering water to container 12 in sufficient quantities to hydrolyze primary chemical hydride 14, or (2) positioning a second chemical hydride which is a mixture of compressible porous medium and another chemical composition, which also serves as a chemical heater, between the water outlet of conduit 19 and primary chemical hydride 14 to generate heat for heating the primary chemical hydride 14 to at least the predetermined temperature, to prevent liquid water from forming an unstable hydroxide or hydrating chemical hydride 14, to convert the water in its liquid state to a water vapor state, and to allow water vapor, i.e., steam, to hydrolyze primary chemical hydride 14 after the temperature of primary chemical hydride 14 reaches about 100 degrees C. Thus, in practicing the invention, the large surge of hydrogen production typically associated with the start-up of a hydrogen generator is avoided, thereby eliminating the need for a large capacity hydrogen storage tank at the output of the hydrogen generator.

A buffer 20 is coupled to container 12 via a conduit 21 for recovering the hydrogen generated inside container 12 during the hydrolysis and thermal decomposition of primary chemical hydride 14. Buffer 20 includes an outlet 20a for supplying an output flow of hydrogen for use by a device (not shown) such as, for example, a fuel cell, a space craft thruster, a hydrogen burner, a storage vessel, etc.

Buffer 20 further serves to supply an initial flow of hydrogen to outlet 20a during the initial start-up of hydrogen generator 10, as well as absorb excess hydrogen generated after hydrogen generator 10 is commanded to stop generating hydrogen. Preferably, buffer 20 contains a rechargeable hydride buffer material, such as a metal hydride, which is capable of supplying an initial flow of hydrogen upon start-up of hydrogen generator 10, and of absorbing excess hydrogen generated when hydrogen generator 10 is commanded to stop hydrogen production. By absorbing excess hydrogen during shut-down, buffer 20 reduces the hydrogen pressure in container 12 from that which is typically associated with system shut-downs, thereby allowing the portion of container 12 which contains primary chemical hydride 14 to be made of lighter gauge materials.

A control unit 22 is provided for controlling an amount of hydrogen generated by hydrogen generator 10. Control unit 22 can be, for example, a pressure switch coupled to buffer 20 via a conduit 23. Control unit 22 senses a hydrogen pressure of container 12 and buffer 20, and generates therefrom a control signal which is supplied, via a conductor 25, to water supply 18 to control the flow of water from water supply 18 to container 12, thereby controlling the hydrolysis of primary chemical hydride 14, and, thus, the flow of hydrogen generated by primary chemical hydride 14 and supplied to buffer 20. Although control unit 22 can be a simple switch to control water supply 18 in an ON-OFF fashion, it is contemplated that control unit 22 can include a controller for receiving multiple pressure inputs and temperature inputs which can be utilized to provide more precise control over the flow of water supplied to container 12.

Preferred embodiments of the invention provide a significant weight reduction over prior generators by eliminating the need for a high pressure hydrogen storage tank to absorb excess hydrogen production and supply hydrogen when demand exceeds production, as well as by allowing the portion of container 12 which contains the primary chemical hydride to be made from lighter gauge materials due to the buffer characteristic of buffer 20. Preferred embodiments of the invention also avoid the need for a heat rejection system by balancing the exothermic hydrolysis rate and the endothermic decomposition inside an isolated thermal container.

In order for hydrogen generator 10 to remain an ultra lightweight unit, however, the primary chemical hydride 14 must be based upon chemical hydrides which bind a relatively high percentage of hydrogen per unit weight. Prime candidates for the primary chemical hydride 14 include chemical hydrides based upon one or more of the elements from the first three rows in the periodic chart, which include metals such as lithium, beryllium, magnesium and aluminum.

Lithium, sodium and magnesium react directly with hydrogen, under commercially convenient pressures and temperature conditions, to form the binary metal hydrides LiH, NaH, and $MgH_2$. Aluminum hydride ($AlH_3$) can be made directly at very high pressures, but it is usually formed in solution. The latter method of forming $AlH_3$, however, results in solvent contamination that is objectionable for some applications, such as for use with fuel cells.

The primary candidates for use with hydrogen generator 10 as the primary chemical hydride 14 are the ternary hydrides including commercially available $LiAlH_4$, $NaAlH_4$, $LiBH_4$ and $NABH_4$. Other ternary hydrides, such as $Mg(AlH_4)_2$ and liquid $Al(BH_4)_3$, are also contemplated for possible use with hydrogen generator 10.

Table I shows the thermal decomposition capabilities of several candidate metal hydrides in order of weight percentage (w/o) of hydrogen evolved, assuming complete thermal decomposition.

TABLE I

| Hydride | Thermal Decomposition |
|---|---|
| LiH | 12.7 w/o |
| $LiAlH_4$ | 10.6 w/0 |
| $AlH_3$ | 10.1 w/o |
| $MgH_2$ | 7.7 w/o |
| NaH | 4.2 w/o |

The thermal decomposition of metal hydrides is generally less than 100% complete due to hydrogen solution in the metal phase. The definition of weight percent (w/o) used herein is the weight of hydrogen divided by the total weight of the reactants, including hydrogen.

As shown in Table II, at low temperatures, in the presence of excess water, all of the metal hydrides listed in Table I form hydroxides.

TABLE II

| Error! Reference source not found. Excess Water Reaction | Stored Water | Product Water |
|---|---|---|
| $LiH + H_2O \rightarrow LiOH + H_2$ | 7.5 w/o | 29.1 w/o |
| $LiAlH_4 + 4H_2O \rightarrow LiAl(OH)_4 + 4H_2$ | 7.3 w/o | 21.2 w/o |
| $AlH_3 + 3H_2O \rightarrow Al(OH)_3 + 3H_2$ | 7.2 w/o | 20.2 w/o |
| $MgH_2 + 2H_2O \rightarrow Mg(OH)_2 + 2H_2$ | 6.3 w/o | 14.2 w/o |
| $NaH + H_2O \rightarrow LiOH + H_2$ | 4.7 w/o | 8.8 w/o |

Table II shows the hydrogen generation capacities, via excess water reactions in weight percent (w/o), of prime candidate metal hydrides. In Table II, the "Stored Water" column includes the weight of the water shown on the left side of the reaction. The "Product Water" column excludes water weight. Several of the hydroxide products listed in Table II also form hydrates. Hydroxides and hydrates decompose at elevated temperatures, thereby liberating steam in the process. If the thermal decomposition of the hydroxides or hydrates occurs to generate $H_2O$ in the presence of unreacted hydrides, an uncontrolled reaction proceeds with potentially dangerous results. The hydrogen pressure which can be produced by these reactions is virtually unlimited. Thus, it is important to precisely control water inventory in container 12 at all times. In addition, it is preferred to provide buffer capacity in buffer 20 to absorb excess hydrogen to prevent excess hydrogen pressures in container 12, or alternatively provide relief valves to vent the excess hydrogen to reduce the internal pressure of container 12.

Hydrides that are thermally stable and form hydroxides upon reaction with excess water at room temperature become less stable and less prone to form hydroxides with increasing temperature. Calcium hydride ($CaH_2$), for example, reacts with water to form the hydroxide ($Ca(OH)_2$) at room temperature. Above 400 degrees C., the product of the water reaction is the oxide (CaO). Any hydroxide formed below 400 degrees C. decomposes endothermically above 580 degrees C., liberating water. If there is any unreacted hydride present when the water is released, it will react instantaneously producing $H_2$ and CaO. The hydride itself decomposes thermally above 600 degrees C.

Magnesium hydride ($MgH_2$) is similar to $CaH_2$, forming a hydroxide at lower temperatures. But, unlike $CaH_2$, $MgH_2$ decomposes thermally at a lower temperature (280 degrees C.) than its hydroxide (350 degrees C.). Lithium hydroxide is stable to its melting point, 450 degrees C. Accordingly, knowledge of the details of all reactions wherein hydrogen or water consumed or released is essential for the effective use of a chemical hydrogen generator.

The preferred chemical hydride for use with hydrogen generator 10 is lithium aluminum hydride ($LiAlH_4$). $LiAlH_4$ is a white microcrystalline powder that turns gray due to aluminum precipitates due to thermal decomposition. $LiAlH_4$ also hydrolyzes slowly in air due to humidity. The hydrolysis and thermal decomposition chemistry of $LiAlH_4$ provides an abundance of hydrogen per unit weight, and $LiAlH_4$ decomposes in a complex manner which can be controlled with temperature and carefully metered water addition. $LiAlH_4$ reacts spontaneously and violently with liquid water, uncontrollably decomposing to give off hydrogen gas and heat.

Table III shows all the known reactions of $LiAlH_4$, including both hydrolysis (Hydro.) and thermal decomposition (Therm.), as defined above, for producing hydrogen and other byproducts.

TABLE III

| No. | Approx. Temperature in degrees C. | Reaction | Type of Reaction | $H_2/H_2O$ |
|---|---|---|---|---|
| 1 | <100 | $LiAlH_4 + 4H_2O \rightarrow LiAl(OH)_4 + 4H_2 +$ Heat | Hydro. | 1.0 |
| 2 | >100 | $LiAl(OH)_4 + Heat \rightarrow LiAlO_2 + 2H_2O$ | Therm. | |
| 3 | >100 | $LiAH_4 + 2H_2O \rightarrow LiAlO_2 + 4H_2 +$ Heat | Hydro. | 2.0 |
| 4 | 100–150 | $3LiAlH_4 + Heat \rightarrow Li_3AlH_6 + 2Al + 3H_2$ | Therm. | |
| 5 | >150 | $Li_3AlH_6 + 4H_2O \rightarrow LiOH + LiAlO_2 + 6H_2 +$ Heat | Hydro. | 1.5 |
| 6 | >220 | $2Li_3AlH_6 + Heat \rightarrow 6LiH + 2Al + 3H_2$ | Therm. | |
| 7 | >220 | $LiH + H_2O \rightarrow LiOH + H_2 +$ Heat | Hydro. | 1.0 |

The hydrolysis chemistry of $LiAlH_4$ divides into two classes: efficient water and inefficient water, often referred to as insufficient water and excessive water, respectively. Reaction No. 3 of Table III shows, for example, the efficient (insufficient) water hydrolysis reaction. In the efficient water hydrolysis reaction of equation 3, one mole of water produces two moles of hydrogen. Reaction Nos. 1 and 7 of Table III shows examples of the inefficient (excessive) water hydrolysis reaction. The inefficient water reaction requires one mole of water to generate one mole of hydrogen. Regardless of whether water is a limiting or excess reagent, the observed enthalpy, or heat of hydrolysis, in both the efficient and inefficient cases is approximately the same, and is approximately 700 kJ/mole.

Figure 2:
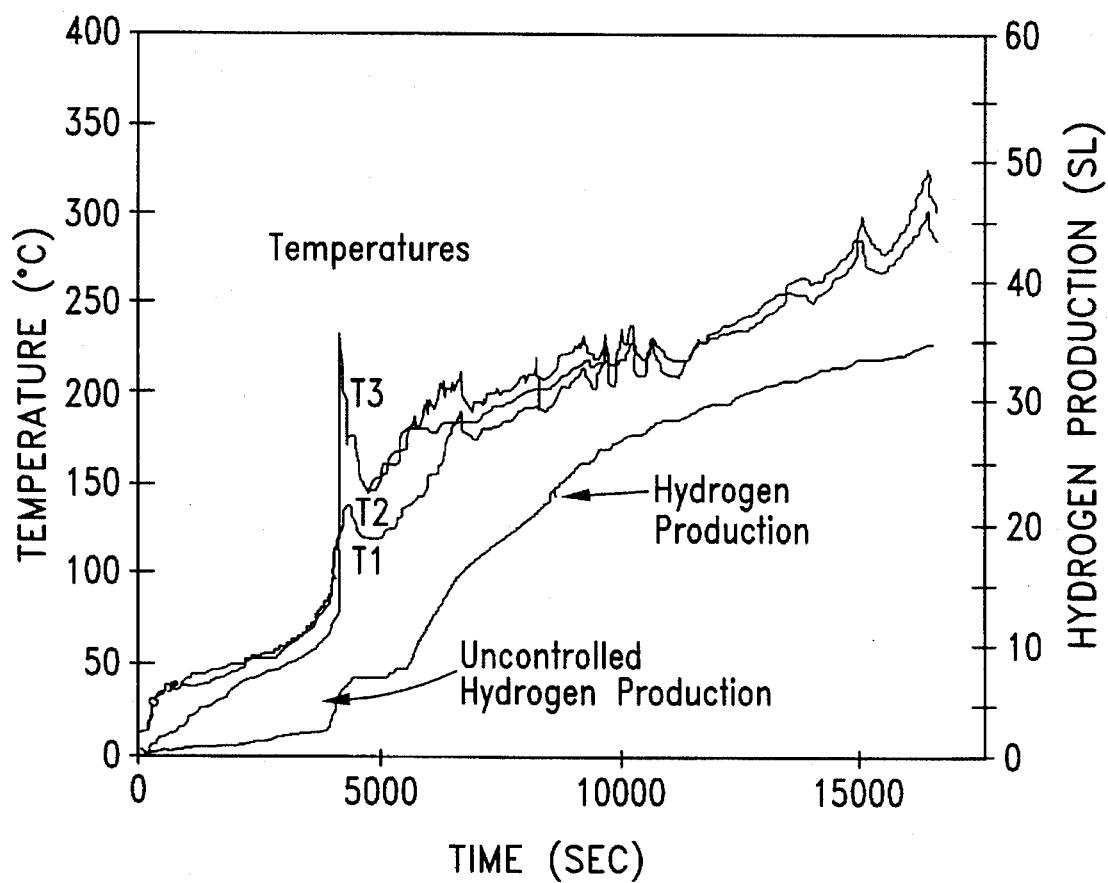
FIG. 2 shows a graph of hydrogen production during the various hydrolysis and thermal decomposition stages of $LiAlH_4$.

In practicing the invention, the reactions set forth in reactions (1) and (2) of Table III are avoided so that large amounts of water and hydrogen are not released in an uncontrolled fashion. For example, FIG. 2 shows, during the time period between 0 and 5000 seconds, the amount of hydrogen and heat generated in container 12 if preheating is not provided. As shown in FIG. 2, during this period, hydrogen generation and temperatures in container 12 increases dramatically at about 4000 seconds due to the production of excess water which in turn reacts with available $LiAlH_4$ to release more hydrogen when the temperature of the $LiAlH_4$ reaches about 100 degrees C. This results in an uncontrolled and excessive production of hydrogen accompanied by uncontrolled temperature elevation. Thus, it is desired to avoid reaction Nos. (1) and (2) in Table III to avoid the problems associated with uncontrolled water release. To avoid the reaction Nos. (1) followed by (2), the $LiAlH_4$ chemical hydride 14 is heated by heating unit 16 to about 100 degrees C. prior to hydrolysis of the primary chemical hydride 14 to generate hydrogen.

The thermal isolation of container 12, preferably a vacuum-insulated dewar similar to the dewars used to contain cryogens, allows the hydrogen generator 10 to be adiabatic to both conserve and use the heat generated above 100 degrees C. The heat above 115 degrees C. generated by exothermic hydrolysis reaction of the $LiAlH_4$ (reaction No. 3 of Table III) is used to generate additional hydrogen by the endothermic thermal decomposition (reaction No. 4 of Table III), which in turn lowers the temperature in container 12. Thus, by providing a thermally isolated environment for the hydrogen generator, and by controlling the supply of water for hydrolysis and the temperature, the generation of hydrogen is maintained stable and controllable through balancing exothermic and endothermic reactions of Table III. The thermal isolation of dewar container 12 also prevents the outer surface thereof from heating, thus allowing the system to be packaged without substantial thermal material expansions and contractions. By utilizing both exothermic and endothermic reactions in hydrogen generator 10, the typical problems associated with volumetric expansion are avoided. Thus, hydrogen generator 10 provides a light weight, portable, and nearly adiabatic, constant volume hydrogen generator.

The hydrogen generator 10 of FIG. 1 will now be described with reference to the preferred embodiments shown in FIGS. 3 and 4. The preferred embodiments of FIGS. 3 and 4 identify hydrogen generator 10 of FIG. 1 as hydrogen generators 10a and 10b, respectively. Hydrogen generators 10a and 10b differ primarily in the manner in which primary chemical hydride 14 is heated and in the timing for supplying water to the hydrogen generator through conduit 19. Therefore, to avoid undue repetition, where possible, the common features of the two embodiments will be discussed together using common element numbers, and structural differences will be identified as they are discussed.

Figure 3:
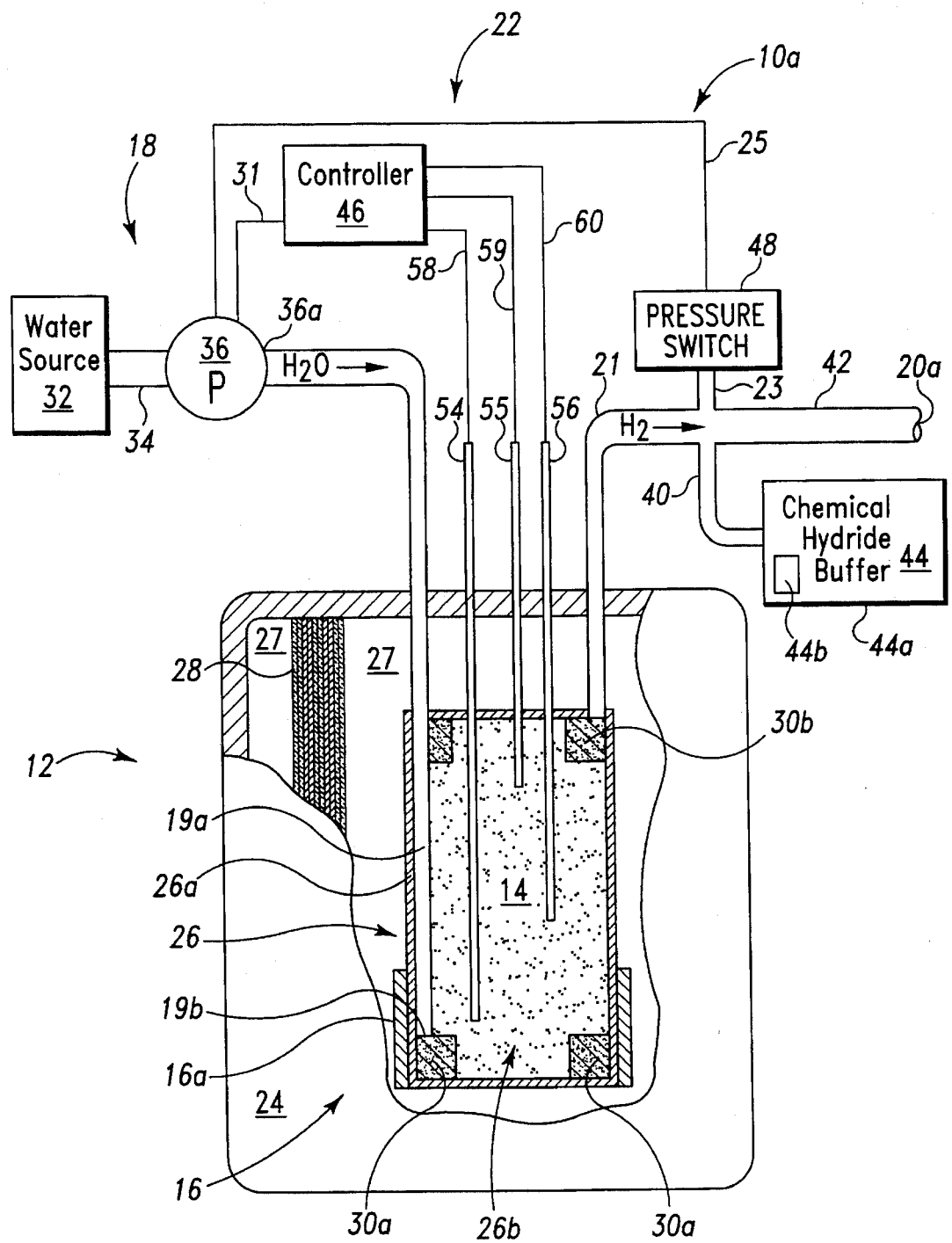
FIG. 3 shows a combined pictorial and block representation of a first embodiment of the invention.
Figure 4:
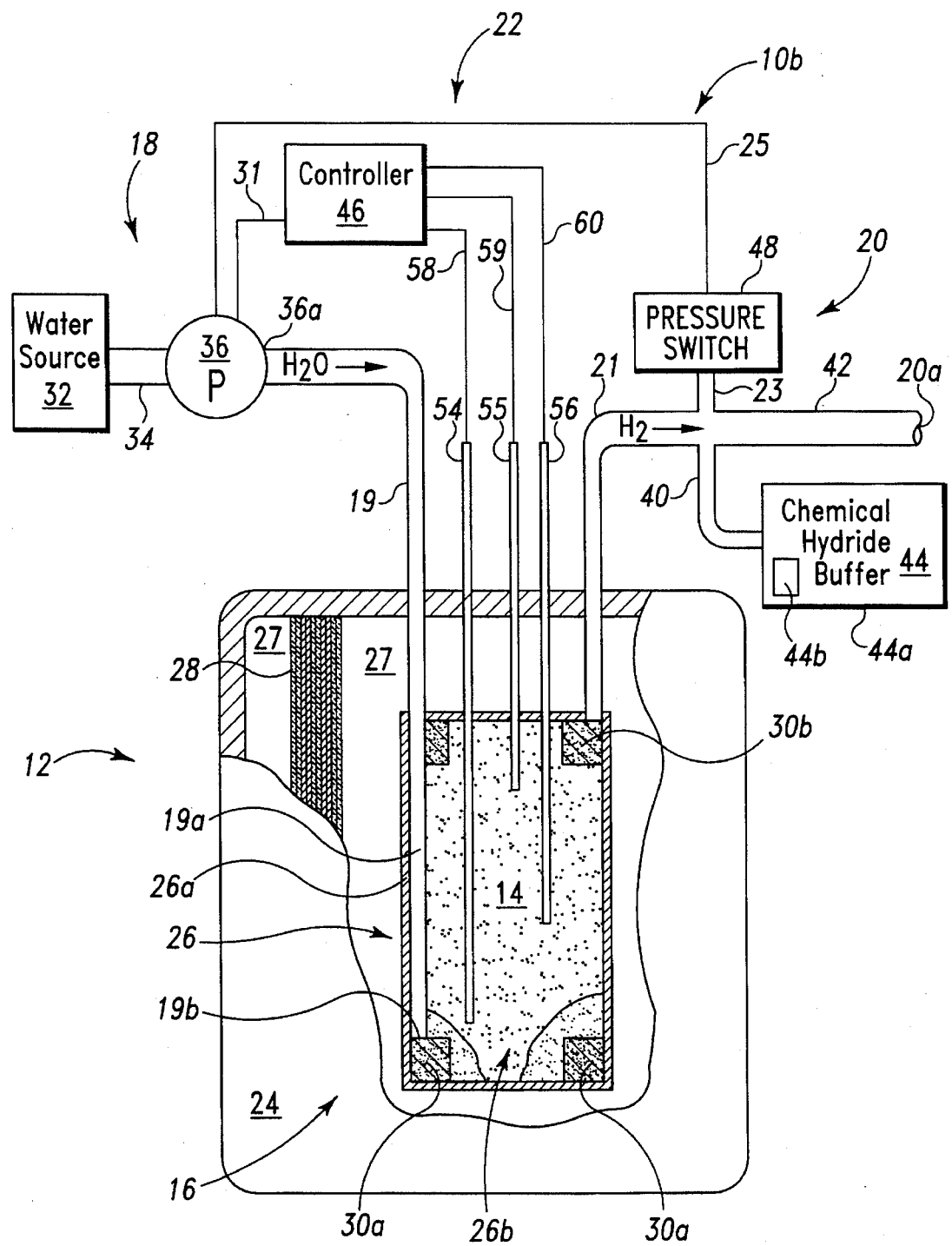
FIG. 4 shows a combined pictorial and block representation of a second embodiment of the invention.

As shown in FIGS. 3 and 4, container 12 comprises a thermally isolated dewar having an outer shell 24 and an inner vessel 26 which combine to define a vacuum space 27 therebetween. Thermal insulation 28 is positioned in vacuum space 27 to form an annular insulating wall around inner vessel 26. Vacuum space 27 may be filled with an insulating material, such as fiberglass, multilayer material, or other insulating materials.

The generation of hydrogen by hydrogen generator 10 primarily occurs in inner vessel 26 of container 12, wherein the primary chemical hydride 14 (preferably $LiAlH_4$) is contained. Inner vessel 26 is preferably made from materials, such as stainless steel and the like, which can accommodate the positive pressures occurring therein during hydrogen generation, as well as accommodate temperatures which can exceed 300 degrees C. In operation, the primary chemical hydride 14 is gradually heated and the hydrolysis and thermal decomposition of primary chemical hydride 14 results in a slow increase in temperature in inner vessel 26, as shown for example in FIG. 2 from 5000 to 15000 seconds. Outer shell 24, however, remains substantially at ambient temperature due to the thermal isolation resulting from the vacuum 27 and the insulation 28 between inner vessel 26 and outer shell 24 of container 12. In turn, the thermal isolation of container 12 thermally isolates the primary chemical hydride 14 from the ambient conditions external to container 12. Therefore, the heat generated during hydrolysis of primary chemical hydride 14 (see, for example, reaction No. 3, Table III) is available to promote further thermal decomposition of primary chemical hydride 14 into hydrogen through induced thermal reactions (see reactions Nos. 4 and 6, Table III). The thermal decomposition of primary chemical hydride 14 is an endothermic reaction which absorbs at least a portion of the heat generated during hydrolysis of primary chemical hydride 14, thereby stabilizing the temperature inside inner vessel 26 below the temperature which would have resulted if no such endothermic reaction occurred. As a result, hydrogen generator 10 is maintained substantially adiabatic.

As stated above, the preferred hydride for primary chemical hydride 14 is a metal hydride having at least one metallic element taken from a group consisting of the metals found in the first three rows of the periodic chart. In preferred embodiments of the invention, this metal hydride is a ternary composition, such as for example, lithium aluminum hydride ($LiAlH_4$).

Also contained in inner vessel 26 is a pair of annular filters 30a and 30b. Filter 30a is positioned in a lower portion of inner vessel 26 and is used to filter $H_2O$, in the forms of either liquid or vapor, entering inner vessel 26. Annular filter 30a distributes the liquid or water vapor entering inner vessel 26 around the lower outer region of inner vessel 26. Filter 30b is positioned in the upper region of inner vessel 26 for filtering the generated hydrogen which has migrated to the top of inner vessel 26.

In FIGS. 3 and 4, heating unit 16 is positioned near a lower portion of inner vessel 26. As shown in FIG. 3, heating unit 16 is an electric heater 16a, preferably a silicon heater, positioned adjacent to an outer surface of inner vessel 26. Electrical energy is supplied to electrical heater 16a by an electrical source (not shown). During the initial start-up of hydrogen generator 10a, electrical heater 16a supplies heat to the side-walls 26a of inner vessel 26, and accordingly, supplies heat to primary chemical hydride 14 ($LiAlH_4$). After an amount of time sufficient for heater 16a to raise the temperature of primary chemical hydride 14 to about 100 degrees C., then controller 46 supplies a signal to a pump 36 of water supply 18 via conductor 31, and pump 36 responds by supplying a metered amount of water via conduit 19 to inner vessel 26.

Water supply 18 includes a water source 32 coupled via a water conduit 34 to pump 36. Pump 36 is coupled at its output 36a to conduit 19. Since chemical hydride 14 and inner vessel 26 are at a temperature of about 100 degrees C., when the water reaches a lower conduit portion 19a of conduit 19, the liquid water is converted to water vapor or steam, which then exits conduit outlet 19b, permeates annular filter 30a, and is in turn distributed annularly in a lower inner region 26b of inner vessel 26. The steam then passes through primary chemical hybrid $LiAlH_4$ to generate hydrogen, initially, according to reaction No. 3 of Table III.

As an alternative to empirically determining the time required to heat primary chemical hybrid to the predetermined temperature, controller 46 can receive temperature feedback signals from one or more of the thermocouples 54–56 via electrical conductors 58–60, respectively, which are positioned at various levels inside inner vessel 26. Thus, once the temperature of chemical hydride 14 reaches the predetermined, substantially uniform temperature, controller 46 generates a signal to activate pump 36 for starting water delivery to inner vessel 26.

The quantity of water supplied to inner vessel 26 is metered so as to promote controllable and sustained hydrolysis and thermal decomposition of primary chemical hydride 14 to generate hydrogen through the complementary exothermic and endothermic reactions identified, for example, as reaction Nos. (3)–(7) in Table III. The hydrogen generated by the primary chemical hydride 14 migrates to the upper region of inner vessel 26, and flows through filter material 30b as the hydrogen exits inner vessel 26 via conduit 21 and is supplied to hydrogen buffer 20.

As shown in FIG. 4, heating unit 16 comprises a chemical heating composition 16b. (However, a supplemental electrical heater 16a can be provided adjacent to sidewall 26a of inner vessel 26 to provide auxiliary heating capacity, if needed.) During start-up of the hydrogen generator 10b shown in FIG. 4, water supply 18 begins immediately to supply water to inner vessel 26 via water conduit 19. Controller 46 actuates, via conductor 31, pump 36 which provides a metered flow of water through conduit 19 into inner vessel 26. Conduit 19 extends vertically to the lower region of inner vessel 26 and supplies liquid water through its output 19b to annular filter 30a. The water permeates filter 30a and is distributed to the outer surface of filter material 30a to begin hydrolysis of chemical heating composition 16b. Preferably, heating composition 16b is a combination of a metal hydride, such as calcium hydride ($CaH_2$ or other similar hydrides), and a compressible porous medium, such as vermiculite. Upon hydrolysis of the $CaH_2$ or other similar hydrides in heating composition 16b, $CaH_2$ or other similar hydrides undergo an exothermic hydrolysis to produce hydrogen and heat, and the heat produced thereby raises the temperature of the composition 16b, the supplied water and the primary chemical hydride 14. After the temperature of the chemical composition 16b reaches 100° C., the supplied water is converted to water vapor which then permeates through the second chemical hydride mixture 16b, to reach primary chemical hydride 14. The heated chemical hydride 14 is further heated by the steam and reacts, initially, according to the exothermic hydrolysis reaction of reaction No. 3 of Table III.

Pump 36 meters the amount of water entering inner vessel 26 so as to prevent to premature saturation of primary chemical hydride 14, and thereafter promotes a controlled and sustained reactions in primary chemical hydride 14 to generate hydrogen through complimentary exothermic and endothermic reactions of the reaction No. (3) through (7) shown in Table III. Pump 36 may be effectually operated by a "bang-bang" controller, i.e. on-off, in response to the internal pressure within inner vessel 26. The heat of vaporization of the supplied water and of the exothermic/endothermic chemical conversations of the primary and secondary chemical hydrides counteract to provide a substantially adiabatic process without the generation of unacceptably high temperatures within the inner vessel.

The hydrogen generated by the heating composition 16b and primary chemical hydride 14 migrates to the upper region of inner vessel 26, and flows through filter material 30b as the hydrogen exits inner vessel 26 via conduit 21 and is supplied to the hydrogen buffer 20.

Hydrogen buffer 20 shown in FIGS. 3 and 4 includes hydrogen conduits 40 and 42, and a rechargeable metal hydride buffer 44. Rechargeable hydride buffer 44 provides a receptacle 44a containing a buffer material 44b which serves as a low pressure hydrogen storage medium capable of both supplying hydrogen and absorbing hydrogen. Preferably, the buffer material 44b is a rare earth pentanickel alloy, such as "Alloy M" sold by Hydrogen Consultants, Inc.

of 12420 North Dumont Way, Littleton, Colo. or a pentanickel alloy. The amount of rechargeable hydride needed varies according to the size and duty cycle of the prescribed load.

Rechargeable hydride buffer 44 provides efficient start-up and shut-down of hydrogen generator 10 by generating the initial flow of hydrogen during start-up and absorbing excess hydrogen generated during shut-down. It also buffers variation in the hydrogen demand during operation.

Upon initial start-up of hydrogen generator 10a and 10b shown in FIGS. 3 and 4, buffer material 44b of rechargeable metal hydride buffer 44 generates an initial output of hydrogen which is supplied to outlet. During this time, primary chemical hydride 14 is being heated by heating unit 16 (i.e., the electrical heater 16a of hydrogen generator 10a, or the chemical heating composition 16b of hydrogen generator 10b) to the predetermined temperature of about 100 degrees C. In hydrogen generator 10b of FIG. 4, however, hydrogen generation begins in inner vessel 26 by the hydrolysis of heating composition 16b. Thus, in hydrogen generator 10b of FIG. 4, rechargeable metal hydride buffer material 44b and heating composition 16b both contribute hydrogen for meeting the initial flow requirements of a device coupled to outlet 20a. After primary chemical hydride 14 reaches a temperature of 100 degrees C., the primary chemical hydride is hydrolyzed with steam which is formed in conduit 19, and the primary chemical hydride 14 becomes the major contributor to the total output of hydrogen from hydrogen generators 10a and 10b.

During shut-down of hydrogen generators 10a and 10b shown in FIGS. 3 and 4, controller 46 commands pump 36 to cease water delivery to inner vessel 26; however, hydrogen continues to be generated in inner vessel 26 until the water contained therein is depleted. During this shut-down phase of hydrogen generator 10, excess hydrogen generated prior to water depletion in inner vessel 26 is absorbed by the buffer metal hydride 44b in rechargeable hydride buffer 44. Buffer 44 also serves to smooth hydrogen demand swings during normal operation.

After initial start-up, the amount of hydrogen production generated by hydrogen generators 10a, 10b is dependent upon the amount of water which is introduced into inner vessel 26, and thus, hydrogen flow from outlet 20a increases in relation to the amount of water which is supplied to inner vessel 26. As the amount of hydrogen generated in inner vessel 26 increases, the hydrogen pressure increases in inner vessel 26, as well as conduits 21, 23, 40 and 42, and in rechargeable metal hydride buffer 44. To control the hydrogen generation and pressure, control unit 22 includes a pressure switch 48 to sense the hydrogen pressure in hydrogen conduit 40 and to generate a signal to reduce or cutoff the flow of water provided by pump 36. As shown in FIGS. 3 and 4, pressure switch 48 is coupled to hydrogen conduit 21 via hydrogen conduit 23. Thus, pressure switch 48 senses the hydrogen pressure in conduit 21, which is coupled to inner vessel 26, and when the sensed pressure reaches the predetermined trigger point of pressure switch 48, pressure switch 48 generates a stop signal which is supplied to pump 36 via electrical conductor 25. Pump 36 responds by stopping the flow of water to inner vessel 26. When the pressure sensed by pressure switch 48 decreases below the trigger point, pressure switch supplies a run signal to pump 36, and pump 36 responds by metering additional water to inner vessel 26 for hydrolysis of the primary chemical hydride 14. Thus, pressure switch 48 cycles pump 36 ON and OFF in relation to the hydrogen pressure in inner vessel 26.

In some applications, it is desirable to know the temperature at various levels within the primary chemical hydride 14 and inner vessel 26. As shown in FIGS. 3 and 4, thermocouples 54, 55 and 56 are arranged to sense the temperatures at the lower, upper and mid regions, respectively, of primary chemical hydride 14 in inner vessel 26. Thermocouples 54, 55 and 56 are electrically coupled to controller 46 via electrical conductors 58, 59 and 60, respectively. From the thermocouple outputs of thermocouples 54–56, controller 46 generates a temperature display which is readable by a human observer. Alternatively, or in addition to the temperature display, controller 46 uses the temperature feedback signals received from thermocouples 54–56 to generate a signal which is supplied to pump 36 via electrical conductor 31 to control or stop pump 36 from supplying water to inner vessel 26, if a temperature in inner vessel 26 exceeds a maximum acceptable value, such as for example, 300 degrees C., or has not yet reached an acceptable temperature, such as for example 100° C. as explained above.

The invention described in the various preferred embodiments above provides a lightweight and portable hydrogen generator which is substantially adiabatic. The inner container 26 is temperature controlled while the outer container 12 remains at ambient temperature. Although the invention has been described in terms of preferred embodiments, workers skilled in the art will recognize that changes may be made in form and in detail without departing from the spirit and scope of the following claims.

What is claimed is:

1. A hydrogen generator, comprising:
   a thermally isolated container;
   a first chemical hydride placed in said thermally isolated container;
   heating means for heating said first chemical hydride to a predetermined temperature;
   a water supply for hydrolysis of said first chemical hydride only after said first chemical hydride reaches said predetermined temperature;
   buffer means for recovering hydrogen from said container; and
   control means for controlling the rate of hydrogen generation by said hydrogen generator.

2. The hydrogen source of claim 1, wherein said thermally isolated container comprises a dewar having an outer shell and an inner vessel defining a vacuum space therebetween, and having thermal insulation positioned in said vacuum space.

3. The hydrogen generator of claim 1, wherein said first chemical hydride comprises a metal hydride.

4. The hydrogen generator of claim 3, wherein said metal hydride comprises at least one metal taken from a group consisting of the metals found in the first three rows of the periodic chart.

5. The hydrogen generator of claim 4, wherein said metal hydride is a ternary composition.

6. The hydrogen generator of claim 5, wherein said ternary composition consists essentially of $LiAlH_4$.

7. The hydrogen generator of claim 6, wherein said heating means heats said $LiAlH_4$ to a temperature greater than about 100 degrees C.

8. The hydrogen generator of claim 1, wherein said heating means comprises a second chemical hydride positioned in said container between said first chemical hydride and said water source for generating an exothermic reaction when said second chemical hydride is combined with water.

9. The hydrogen generator of claim 8, wherein said second chemical hydride comprises a metal hydride.

10. The hydrogen generator of claim 9, wherein said metal hydride consists essentially of $CaH_2$ or other similar hydrides.

11. The hydrogen generator of claim 1, wherein said heating means comprises an electrical heater.

12. The hydrogen generator of claim 1, wherein said water supply comprises:
- a water source;
- a water pump hydraulically coupled to said water source and electrically coupled to said control means; and
- a water conduit coupled between said water pump and said container.

13. The hydrogen generator of claim 12, wherein said water source further comprises an annular filter positioned in said container adjacent an outlet of said water conduit.

14. The hydrogen generator of claim 13, wherein said second chemical hydride further comprises a compressible porous medium positioned between said annular filter and said first chemical hydride to prevent liquid water from hydrating said first chemical hydride while a temperature of said first chemical hydride is below said predetermined temperature.

15. The hydrogen generator of claim 1, wherein said buffer means comprises:
- an outlet conduit coupled to said container;
- a buffer chamber coupled to said outlet conduit; and
- a rechargeable hydride positioned in said buffer chamber.

16. The hydrogen generator of claim 15, wherein said rechargeable hydride supplies hydrogen to said outlet conduit when said first chemical hydride is being heated by said heating means, and absorbs excess hydrogen after said hydrolysis is stopped by said control means from hydrolyzing said first chemical hydride.

17. The hydrogen generator of claim 16, wherein said rechargeable hydride comprises a metal hydride.

18. The hydrogen generator of claim 1, wherein said control means comprises a pressure switch coupled to said container for sensing a hydrogen pressure in said container, and for generating a signal corresponding to said hydrogen pressure, said pressure switch being electrically coupled to said water supply for supplying control signals thereto.

19. A hydrogen generator, comprising:
- a thermally isolated container;
- a water source having a water conduit for supplying water into said container;
- a first chemical hydride placed in said container;
- a control for operation of said water source;
- a chemical composition positioned in said container between said first chemical hydride and an outlet of said water conduit, said chemical composition including components to react exothermically with water supplied into said container to heat said first chemical hydride,
- said control operating said water source to supply water to said container, prior to hydrolysis of said first chemical hydride, to generate within said container a temperature sufficient to prevent said first chemical hydride from forming unstable products when said first chemical hydride is hydrolyzed and thereafter at a rate to maintain an adiabatic generation of hydrogen by said first chemical hydride; and
- recovery means for recovering hydrogen from said container.

20. The hydrogen source of claim 19, wherein said thermally isolated container comprises a dewar having an outer shell and an inner vessel defining a vacuum space therebetween, and having a thermal insulating material positioned in said vacuum space.

21. The hydrogen generator of claim 19, wherein said first chemical hydride comprises a metal hydride.

22. The hydrogen generator of claim 21, wherein said metal hydride comprises at least one metal taken from a group consisting of the metals found in the first three rows of the periodic chart.

23. The hydrogen generator of claim 22, wherein said metal hydride comprises a ternary composition.

24. The hydrogen generator of claim 23, wherein said ternary composition consists essentially of $LiAlH_4$.

25. The hydrogen generator of claim 19, wherein said chemical composition generates sufficient heat to raise the temperature of said $LiAlH_4$ above about 100 degrees C. prior to the hydrolysis of said $LiAlH_4$.

26. The hydrogen generator of claim 19, wherein said mixture of components of said chemical composition comprise:
- a second chemical hydride; and
- a compressible porous medium.

27. The hydrogen generator of claim 26, wherein said second chemical hydride, when hydrolyzed, generates an exothermic reaction and exhibits stable hydrogen generation characteristics while at a temperature below about 590 degrees C.

28. The hydrogen generator of claim 26, wherein said second chemical hydride comprises a metal hydride.

29. The hydrogen generator of claim 28, wherein said chemical hydride consists essentially of $CaH_2$ or other similar hydride.

30. The hydrogen generator of claim 26, wherein said compressible porous medium comprises vermiculite.

31. The hydrogen generator of claim 19, wherein said recovery means comprises:
- a hydrogen conduit coupled to said container;
- a buffer chamber coupled to said hydrogen conduit; and
- a rechargeable hydride positioned in said buffer chamber.

32. The hydrogen generator of claim 31, wherein said rechargeable hydride comprises a metal hydride.

33. The hydrogen generator of claim 31, wherein said rechargeable hydride supplies hydrogen to said hydrogen conduit when said first chemical hydride is being heated by said chemical composition, and absorbs excess hydrogen generated after said water source is stopped from supplying water to said container.

34. The hydrogen generator of claim 19, wherein said control means comprises a pressure switch coupled to said hydrogen conduit, said pressure switch sensing a pressure of said hydrogen to generate a signal corresponding to said pressure of said hydrogen, and said pressure switch being coupled to said water source to control a flow of water to said container based on said pressure signal.

35. A hydrogen generator, comprising:
- a thermally isolated container;
- a first chemical hydride placed in said container;
- a water supply for hydrolysis of said first chemical hydride, said water supply including a water source for supplying water into said container via a water conduit;
- a hydrogen conduit coupled to said container for supplying a flow of hydrogen from said container;
- control means for controlling the supply of water to said container to obtain an adiabatic generation of hydrogen from said first chemical hydride; and
- buffer means coupled to said hydrogen conduit, said buffer means containing a rechargeable hydride for generating hydrogen upon initial start-up of said hydrogen generator, and for absorbing excess hydrogen generated after said water source is stopped from supplying water into said container containing said first chemical hydride.

36. The hydrogen generator of claim 35, wherein said first chemical hydride comprises at least one metal taken from a group consisting of the metals found in the first three rows of the periodic chart.

37. The hydrogen generator of claim 35, wherein said first chemical hydride consists of $LiAlH_4$.

38. The hydrogen generator of claim 35, wherein said buffer means comprises a receptacle containing said rechargeable hydride.

39. The hydrogen generator of claim 38, wherein said rechargeable hydride comprises a metal hydride.

40. The hydrogen generator of claim 35, further comprising preheating means to preheat the first chemical hydride to a predetermined acceptable temperature prior to hydrolysis of said first chemical hydride.

41. The hydrogen generator of claim 40 wherein said preheating means comprises a chemical composition positioned in said container between said first chemical hydride and an outlet of said water conduit, said chemical composition including components to react with water supplied to said container to heat said first chemical hydride, and to delay the flow of water to said first chemical hydride until the first chemical hydride has reached a predetermined temperature sufficient to prevent said first chemical hydride from undergoing an unstable exothermic reaction when said first chemical hydride is hydrolyzed.

42. The hydrogen generator of claim 41, wherein said chemical composition comprises a metal hydride.

43. The hydrogen generator of claim 40, wherein said metal hydride consists essentially of $CaH_2$ or other similar hydrides.

44. The hydrogen generator of claim 35, further comprising an electrical heater coupled to said container for heating said first chemical hydride to a predetermined temperature prior to hydrolysis of said first chemical hydride.

45. A small, lightweight, controllable hydrogen generator, comprising:
a container forming a dewar having an outer shell and an inner vessel defining a vacuum space therebetween, and having thermal insulating material positioned in said vacuum space;
a first chemical hydride placed in said inner vessel;
heating means for heating said first chemical hydride to a predetermined temperature sufficient to prevent said first chemical hydride from undergoing unstable reactions when hydrolyzed;
a water supply for hydrolysis of said first chemical hydride only after a temperature of said first chemical hydride reaches said predetermined temperature, said water supply including a water pump for supplying water into said inner vessel via a water conduit;
a hydrogen conduit coupled to said inner vessel for supplying a flow of hydrogen from said inner vessel;
control means for controlling said water pump and the generation of hydrogen; and
buffer means coupled to said inner vessel, said buffer means containing a rechargeable hydride for generating hydrogen prior to the temperature of said first chemical hydride reaching said predetermined temperature, for absorbing excess hydrogen after said water pump is stopped from supplying water to said container, and for smoothing the hydrogen flow due to changing load demands.

46. The hydrogen generator of claim 45, wherein said first chemical hydride comprises at least one metal taken from a group consisting of the metals found in the first three rows of the periodic chart.

47. The hydrogen generator of claim 46, wherein said first chemical hydride consists of $LiAlH_4$.

48. The hydrogen generator of claim 47, wherein said heating means comprises a chemical composition positioned in said inner vessel between said first chemical hydride and an outlet of said water conduit, said chemical composition including components to react exothermically with water supplied into said inner vessel to heat said first chemical hydride,
said control operating said water pump to deliver an initial supply of water to said inner vessel prior to the hydrolysis of said first chemical hydride to generate within said inner vessel a temperature sufficient to prevent said first chemical hydride from forming an unstable product when said first chemical hydride is hydrolyzed.

49. The hydrogen generator of claim 48, wherein said chemical composition components comprise a metal hydride and vermiculite.

50. The hydrogen generator of claim 49, wherein said metal hydride consists essentially of $CaH_2$ or other similar hydrides.

51. The hydrogen generator of claim 45, wherein said heating means includes a chemical compound having a chemical component providing an exothermic reaction with water, wherein said compound includes a mixture of compressible porous medium and chemical hydrides positioned between an outlet of said water conduit and said first chemical hydride to prevent liquid water from forming undesirable products in said first chemical hydride while a temperature of said first chemical hydride is below said predetermined temperature.

52. The hydrogen generator of claim 45, wherein said heating means comprises an electrical heater.

53. The hydrogen generator of claim 45, wherein said buffer means comprises a receptacle coupled to said hydrogen conduit, wherein said receptacle contains said rechargeable hydride.

54. The hydrogen generator of claim 45, wherein said rechargeable hydride comprises a metal hydride.

* * * * *